(12) United States Patent
Hasegawa et al.

(10) Patent No.: US 8,601,647 B2
(45) Date of Patent: Dec. 10, 2013

(54) CLIP

(75) Inventors: Takahiro Hasegawa, Toyota (JP);
Wataru Kojima, Utsunomiya (JP)

(73) Assignee: Nifco Inc., Yokohama-Shi (JP)

( * ) Notice: Subject to any disclaimer, the term of this patent is extended or adjusted under 35 U.S.C. 154(b) by 20 days.

(21) Appl. No.: 13/138,968

(22) PCT Filed: Apr. 27, 2010

(86) PCT No.: PCT/JP2010/057506
§ 371 (c)(1),
(2), (4) Date: Jan. 6, 2012

(87) PCT Pub. No.: WO2010/128635
PCT Pub. Date: Nov. 11, 2010

(65) Prior Publication Data
US 2012/0102687 A1    May 3, 2012

(30) Foreign Application Priority Data

May 8, 2009 (JP) ................................. 2009-113315

(51) Int. Cl.
*F16B 21/08* (2006.01)
(52) U.S. Cl.
USPC ............. 24/297; 24/581.11; 24/458; 411/508
(58) Field of Classification Search
USPC ............. 24/458, 297, 581.11, 289, 292–295; 411/508–510; 296/108, 146.7, 214
See application file for complete search history.

(56) References Cited

U.S. PATENT DOCUMENTS 3,864,789 A * 2/1975 Leitner ............................ 24/293
4,630,338 A * 12/1986 Osterland et al. ............... 24/293
4,762,437 A * 8/1988 Mitomi ............................ 403/11
6,435,790 B1 * 8/2002 Ichikawa ........................ 411/349
6,575,681 B2 * 6/2003 Kojima et al. .................. 411/508

(Continued)

FOREIGN PATENT DOCUMENTS

EP    1 748 197 A1    1/2007
JP    S55-135216      10/1980

(Continued)

OTHER PUBLICATIONS

Machine-generated English translation of EP 1748197.*
Korean Patent Office, "Office Action for KR 10-2011-7025491 and Japanese translation thereof", Dec. 14, 2012.
European Patent Office, "Extended European Search Report for EP 10 77 2154", May 27, 2013.

*Primary Examiner* — Robert J Sandy
*Assistant Examiner* — Rowland D Do
(74) *Attorney, Agent, or Firm* — Manabu Kanesaka

(57) ABSTRACT

A clip includes a head portion locking one of the attaching member or the attached member; a center support pillar extending downward from the head portion, to be inserted into the attachment holes; auxiliary support pillars extending downward from the head portion such that a longitudinal direction of a cross-sectional surface perpendicular to an extending direction thereof is perpendicular to that of a cross-sectional surface perpendicular to an extending direction of the center support pillar; and a pair of elastic legs interconnected with end portions of the center support pillar and the auxiliary support pillar, and expanding in a V-shape from an end toward the head portion side. Locking portions are provided in end portions of the elastic legs, to lock with the other of the attaching member or the attached member, and empty spaces are provided in the auxiliary support pillar, for housing deformed portions of the elastic legs.

5 Claims, 3 Drawing Sheets

(56) References Cited

U.S. PATENT DOCUMENTS

| | | | | |
|---|---|---|---|---|
| 6,665,914 | B2 * | 12/2003 | Ogawa | 24/297 |
| 6,805,524 | B2 * | 10/2004 | Kanie et al. | 411/174 |
| 7,152,281 | B2 * | 12/2006 | Scroggie | 24/297 |
| 7,878,749 | B2 * | 2/2011 | Edland | 411/508 |
| 8,113,756 | B2 * | 2/2012 | Wakabayashi et al. | 411/508 |
| 2005/0087656 | A1 | 4/2005 | Yonezawa | |
| 2008/0052878 | A1 | 3/2008 | Lewis et al. | |
| 2010/0322743 | A1 | 12/2010 | Ostergren | |
| 2011/0058915 | A1 | 3/2011 | Scroggie et al. | |

FOREIGN PATENT DOCUMENTS

| | | |
|---|---|---|
| JP | U-S62-156612 | 10/1987 |
| JP | H03-113108 | 5/1991 |
| JP | H07-248013 | 9/1995 |
| JP | H08-061334 | 3/1996 |
| JP | 2002-089523 | 3/2002 |
| JP | 2002-276633 | 9/2002 |

* cited by examiner

CLIP

TECHNICAL FIELD

The present invention relates to a clip capable of attaching an attaching member to an attached member with a single touch of a finger. The present invention is the clip for fixing, for example, a fender protector to a fender, and relates to the clip which improves workability when the clip is attached, and also which can be easily attached to a proper position.

BACKGROUND ART

FIG. 6 is a perspective view of a clip 41 which is one example of a conventional clip. In FIG. 6, for example, as described in the following Patent Document 1 (Japanese Utility Model Publication No. S62-156612), the clip 41 is provided with a first support pillar 42 and a second support pillar 43 integrally drooping from a head portion which is not shown in the figure; and a first elastic leg 44 and a second elastic leg 45 extending from end portions of the first support pillar 42 and the second support pillar 43 toward a head portion side, in a V-shape. Also, the first support pillar 42, the second support pillar 43, the first elastic leg 44, and the second elastic leg 45 are mutually provided so as to be symmetrical with respect to a point.

FIG. 7 is a perspective view of a clip 51 which is another example of a conventional clip. In FIG. 7, for example, as described in the following Patent Document 2 (Japanese Patent Publication No. 2002-276633), the clip 51 is configured by a head portion 52 abutting against one surface of a panel when the clip 51 is inserted into an attachment hole of the panel; a support pillar 53 extending downward from a center portion of the head portion 52; V-shaped elastic legs 55 turned back toward a head portion 52 side from an end portion 54 of the support pillar 53; and locking portions 56 provided on an outside of the elastic legs 55.

PRIOR ART DOCUMENT

Patent Document

Patent Document 1: Japanese Utility Model Publication No. S62-156612

Patent Document 2: Japanese Patent Publication No. 2002-276633

SUMMARY OF THE INVENTION

Problems To Be Solved By the Invention

In the clip 41 described in the Patent Document 1, for example, in a case when the clip 41 is attached to a narrow place such as an inside of the fender in an unnatural working posture and the like, when the clip 41 is inserted into an opening portion, there is a case in which a claw 46 of the clip 41 is chipped, and as a result, there is a case in which the clip 41 comes off from the attaching member and the attached member after the clip 41 is inserted. Also, the clip 41 is difficult to be inserted straight into the opening portion due to a shape of the elastic legs 44 and 45, so that after the clip 41 is inserted, there is a case in which the clip 41 comes off from the attaching member and the attached member.

Also, in the clip 51 described in the Patent Document 2, in a case when the clip 51 is attached to the narrow place in the unnatural working posture and the like, when the clip 51 is inserted into the opening portion, there is a case in which one portion of the clip 51 is chipped, so that after the clip 51 is inserted, there is a case in which the clip 51 comes off from the attaching member and the attached member.

In order to solve the aforementioned problems, an object of the present invention is to provide a clip in which even in a case attaching the clip to a place where a sufficient space for an attachment work cannot be obtained, the clip can be easily attached to an attachment position in a correct direction, and also after the attachment, the clip is difficult to come off from the attaching member and the attached member.

Device For Solving the Problems

A clip of the present invention is attached to an attachment hole provided in an attaching member and an attached member, and comprises a head portion locking in one surface of one of either the attaching member or the attached member; a center support pillar extending downward from the head portion, and inserted into the attachment hole; an auxiliary support pillar extending downward from the head portion, and provided in such a way that a longitudinal direction of a cross-sectional surface perpendicular to an extending direction thereof is perpendicular to a longitudinal direction of a cross-sectional surface perpendicular to an extending direction of the center support pillar; a pair of elastic legs interconnected with end portions of the center support pillar and the auxiliary support pillar, and expanding in a V-shape from the end portions toward the head portion side; a locking portion provided in end portions of the elastic legs, and locking in the other of either the attaching member or the attached member; and an empty space interconnected with the head portion from a base portion of the elastic legs, and formed in the auxiliary support pillar for receiving the elastic legs when the elastic legs are deformed.

Also, in the clip of the present invention, preferably, in the center support pillar and at least one of the elastic legs, there is provided a guide surface inclining toward the head portion side from the end portion of the center support pillar.

Effect of the Invention

According to the clip of the present invention, the center support pillar is disposed so as to be symmetrical with respect to a line relative to a center axis of the clip, and also the auxiliary support pillar is disposed so as to be symmetrical with respect to a point relative to the center axis, so that even if there is an incline when the clip is attached, a centering is carried out, so that an attachment position is never out of alignment, and the clip can be attached promptly and accurately.

Also, according to the clip of the present invention, there is provided the empty space in a position capable of housing the elastic legs when the elastic legs are inserted into the attachment hole of the attached member, and the auxiliary support pillar is provided in a point-symmetric position relative to a center point, so that the clip is attached while being centered without inclining.

According to the present invention, since the guide surfaces of the center support pillar and the auxiliary support pillar are formed in such a way as to be nearly perpendicular, when the clip is inserted into the opening portion of the attached member, the centering is automatically carried out, so that the attachment can be easily carried out, and the clip can be attached promptly and accurately.

According to the present invention, even when an attachment working posture is carried out in a wrong condition, one portion of the clip is never chipped, or the center of the clip never becomes out of alignment so as to be capable of attaching the clip to a predetermined position.

EMBODIMENT FOR CARRYING OUT THE INVENTION

Figure 1:
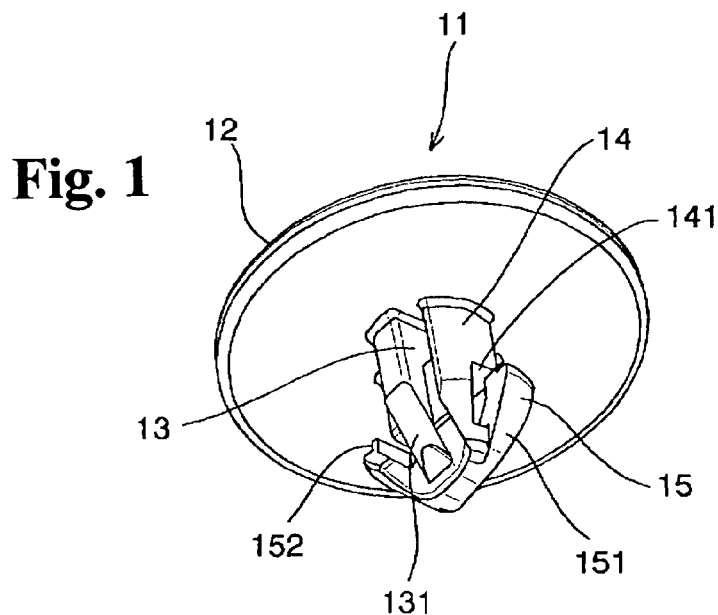
FIG. 1 is a perspective view of a clip 11 which is an embodiment of the present invention.

Hereinafter, a clip explained with reference to the drawings is one example of the present invention, and comprises at least a head portion, a center support pillar, an auxiliary support pillar, elastic legs, locking portions, and empty spaces. By attaching the clip to an attachment hole provided in a fender protector which is one example of an attaching member, and a fender which is one example of an attached member, the fender protector can be fixed to the fender. The head portion has a shape capable of locking on one surface of one of either the fender protector or the fender. The center support pillar extends (protrudes) downward from the head portion, and has a size and a shape corresponding to the attachment hole.

The auxiliary support pillar extends downward from the head portion in the same manner as the center support pillar, and is integrally provided with the head portion and the center support pillar in such a way that a longitudinal direction of a cross-sectional surface perpendicular to an extending direction thereof is perpendicular to a longitudinal direction of a cross-sectional surface perpendicular to an extending direction of the center support pillar. A pair of elastic legs expanding in a V-shape is interconnected with end portions of the center support pillar and the auxiliary support pillar, and also formed in a shape so as to be turned back toward the head portion side from the end portions.

The locking portions are provided on end portions of the elastic legs, and have a shape capable of locking in one side at the fender protector or the fender, which does not lock in the head portion. Namely, when the fender protector and the fender are fixed by the clip of the present embodiment, the fender protector and the fender come to a state sandwiched by the head portion and the locking portions. Also, in the auxiliary support pillar, there are provided the empty spaces housing relevant deformed portions when the elastic legs are inserted into the attachment hole while the elastic legs are deforming. In the clip, the center support pillar is disposed so as to be symmetrical with respect to a line, and also the auxiliary support pillar is disposed so as to be diagonal (symmetrical with respect to a point). Even if there is an incline when the clip is attached, a centering is carried out, so that an attachment position is never out of alignment, and the clip can be attached promptly and accurately. Also, as for the empty spaces, when the center support pillar and the auxiliary support pillar are inserted into the attachment hole of the fender protector and the fender, the deformed portions of the elastic legs are housed in the empty spaces of the auxiliary support pillar without bumping into the auxiliary support pillar, so that the auxiliary support pillar can be disposed further compactly.

Also, in the clip of the present embodiment, in the center support pillar and at least one of the elastic legs, there are provided guide surfaces inclining toward the head portion side from the end portion of the center support pillar. When the center support pillar, the auxiliary support pillar, and the elastic legs of the clip are inserted into the attachment hole of the fender protector and the fender, the guide surfaces abut against a hole edge of the attachment hole, so that the center support pillar and the auxiliary support pillar are guided to a center position of the attachment hole. Therefore, the clip of the present embodiment can be easily attached to the fender protector and the fender, and even if an attachment work is carried out in a wrong posture condition, an attachment error is not prone to occur.

Figure 2:
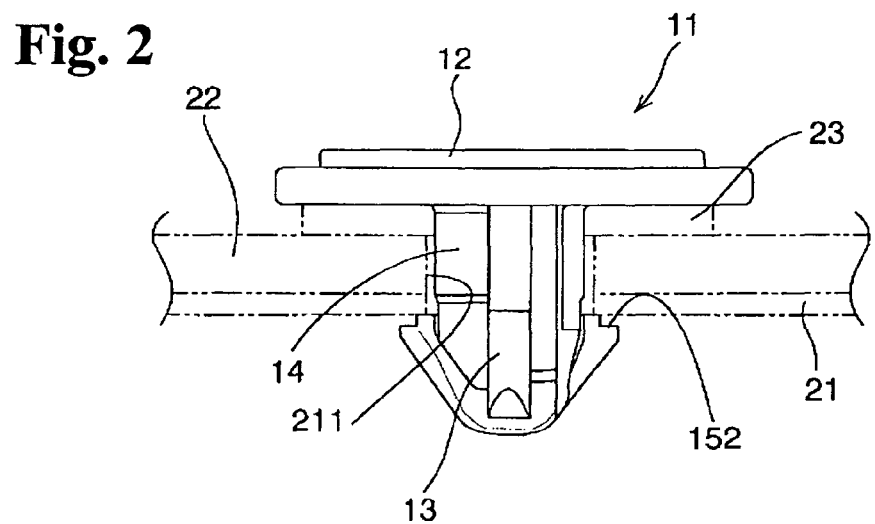
FIG. 2 is a view for explaining a condition wherein the clip 11 is attached to an attachment hole 211 provided in panels 21 and 22.

FIG. 1 is a perspective view of a clip 11 which is an embodiment of the present invention. FIG. 2 is a view for explaining a condition wherein the clip 11 is attached to an attachment hole 211 provided in panels 21 and 22. In the following explanation, the clip 11, capable of fixing the panels 21 and 22 by attaching to the attachment hole 211 provided in the panels 21 and 22 which are one example of the attaching member and the attached member, is illustrated as an example.

The clip 11 of the present example comprises a head portion 12; a center support pillar 13; an auxiliary support pillar 14; elastic legs 15; locking portions 152; and empty spaces 141. The head portion 12 has an approximately disk-like shape, and is locked on one surface of the panel 22 through a packing 23. The center support pillar 13 extends downward from the head portion 12, and has a shape to be inserted into the attachment hole 211.

The auxiliary support pillar 14 integrally extends downward from the head portion 12 in the same manner as the center support pillar 13, and in a base portion inserted into the attachment hole 211, the auxiliary support pillar 14 is integrally formed with the head portion 12 and the center support pillar 13 vertically (so as to differ approximately 90 degrees from the center support pillar 13) relative to the center support pillar 13. The elastic legs 15 are interconnected with ends of the center support pillar 13 and the auxiliary support pillar 14, and also integrally formed in a shape so as to be turned back toward a direction of the head portion 12 and the auxiliary support pillar 14.

The locking portions 152 locking with the panel 21 are formed in the end portions of the elastic legs 15, and for example, locked in an opening portion of the fender protector and the fender. Also, the auxiliary support pillar 14 is interconnected with the head portion 12 from the base portion of the elastic legs 15, and there are formed the empty spaces 141 receiving the elastic legs 15 when the elastic legs 15 are deformed. In the clip 11, the center support pillar 13 is disposed so as to be symmetrical with respect to a line, and also the auxiliary support pillar 14 is disposed so as to be diagonal (symmetrical with respect to a point).

Even if there is an inclination when the clip 11 with the aforementioned structure is attached, the centering can be easily carried out, so that the attachment position is never out of alignment, and the clip 11 can be attached promptly and accurately. Also, when the elastic legs 15 are inserted into the attachment hole 211 of the attached member, the empty spaces 141 are provided in a position capable of housing the elastic legs 15 in one portion of the auxiliary support pillar 14.

Consequently, the auxiliary support pillar 14 is provided in a point-symmetric position so as to be capable of being formed compactly.

Also, in the center support pillar 13 and the auxiliary support pillar 14 of the clip 11, there are provided guide surfaces 131 and 151 inclined toward a head portion 12 side from the end portion of the center support pillar 13. The guide surfaces 131 and 151 abut against the hole edge of the attachment hole 211 when the center support pillar 13 and the auxiliary support pillar 14 of the clip 11 are inserted into the attachment hole 211 so as to guide the center support pillar 13 and the auxiliary support pillar 14 to the center position of the attachment hole 211. Therefore, the clip 11 can be easily attached to the panels 21 and 22, and even if the attachment work is carried out in the wrong posture condition, the attachment error is not prone to occur.

Figure 3:
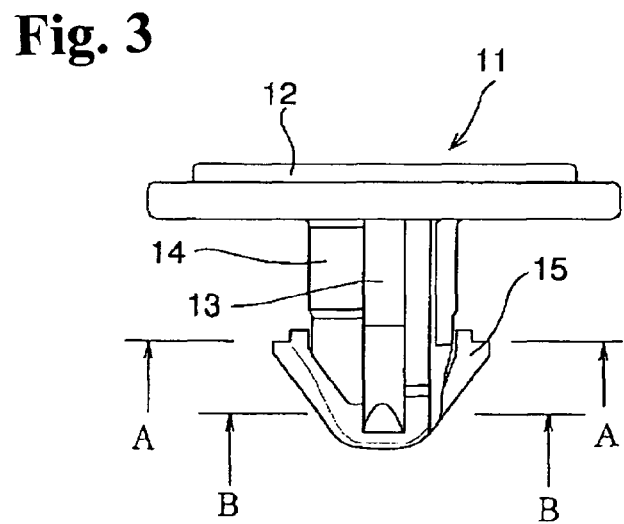
FIG. 3 is a cross-sectional view of the clip 11.
Figure 4:
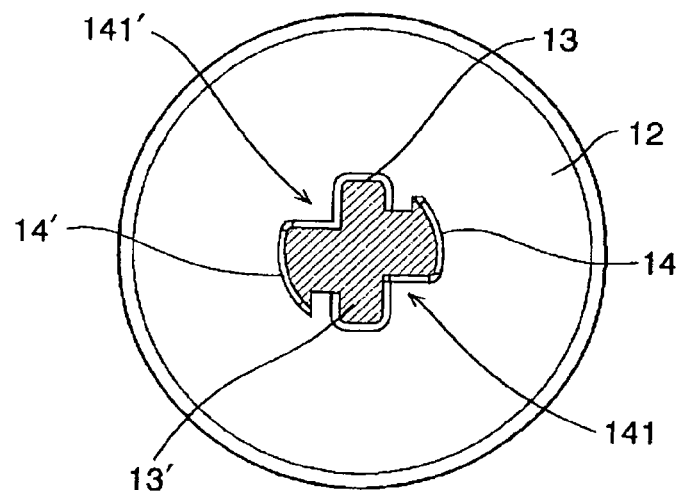
FIG. 4 is a cross-sectional view of a line A-A in FIG. 3.
Figure 5:
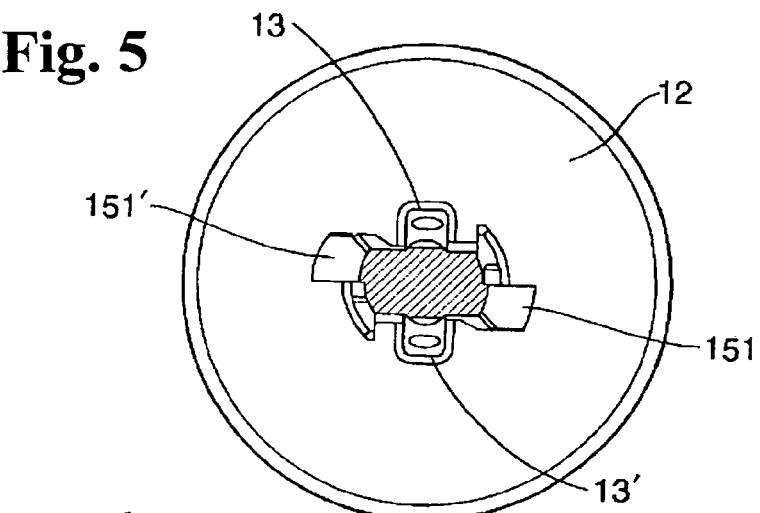
FIG. 5 is a cross-sectional view of a line B-B in FIG. 3.
Figure 6:
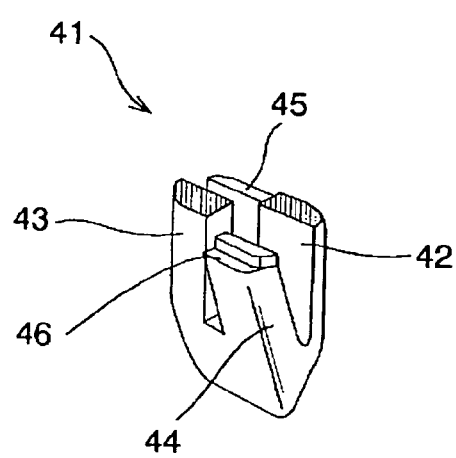
FIG. 6 is a perspective view of a clip 41 which is one example. of a conventional clip.
Figure 7:
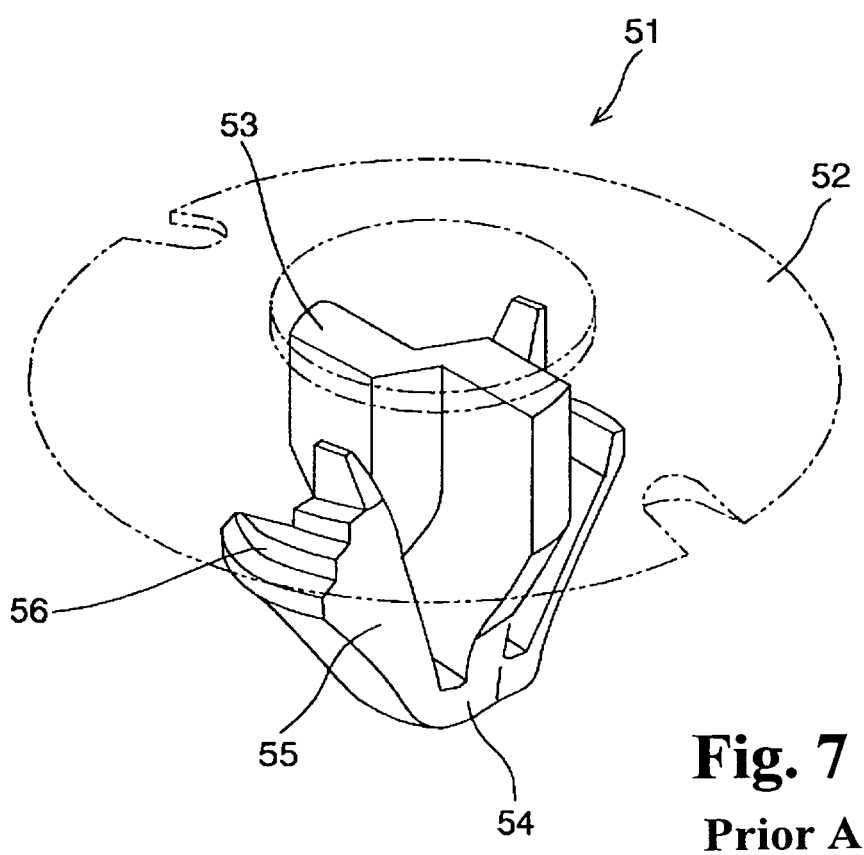
FIG. 7 is a perspective view of a clip 51 which is another example of the conventional clip.

FIG. 3 is a cross-sectional view of the clip 11. Also, FIG. 4 is a cross-sectional view along a line A-A in FIG. 3, and FIG. 5 is a cross-sectional view along a line B-B in FIG. 3. As shown in FIG. 4, the center support pillars 13 and 13' are provided so as to be symmetrical with respect to a line near the base portion close to the head portion 12. Also, the auxiliary support pillars 14 and 14' are provided so as to be symmetrical with respect to a point relative to the center. Incidentally, the cross-sectional shapes of the center support pillars 13 and 13' and the auxiliary support pillars 14 and 14' are approximately cross-shaped near the head portion 12, i.e., in the base portion.

As shown in FIG. 5, since the guide surfaces 131 are provided as mentioned above, in the center support pillars 13 and 13', a cross-sectional area in the cross-sectional surface perpendicular to the extending direction is reduced as the center support pillars 13 and 13' come close to the end portion. Also, in the auxiliary support pillars 14 and 14', the empty spaces 141 and 141' are provided in one portion. In the empty spaces 141 and 141', turned-back portions of the elastic legs 15 passing through the panels 21 and 22 are housed when the center support pillar 13 and the auxiliary support pillar 14 are inserted into the attachment hole 211. Incidentally, the elastic legs 15 expand again after passing through the attachment hole 211, and the locking portions 152 of ends of the elastic legs 15 engage the panel 21.

In a case when the fender protector is fixed to the fender using the clip 11 of the present example, for example, a hole diameter of the attachment hole 211 is required to be configured within 7 mm, and a plate back of the fender is required to be configured within 5 mm.

As mentioned above, although one example of the embodiment of the present invention is described, the present invention is not limited to the embodiment described hereinabove, and various design modifications can be carried out provided that they do not exceed the subject described in the claims of the present invention. Naturally, the shape and the size of each portion of the clip of the present invention can be modified provided that they are within a range described in the claims of the present invention.

The present application is based on Japanese Patent Application No. 2009-113315 filed on May 8, 2009, and all content thereof is incorporated in its entirety herein as a reference.

EXPLANATION OF SYMBOLS 11 a clip
12 a head portion
13 a center support pillar
131 guide surfaces
14 an auxiliary support pillar
141 empty spaces
15 elastic legs
151 guide surfaces
152 locking portions
21 a panel
211 an attachment hole
22 a panel
23 a packing

What is claimed is:

1. A clip attached to attachment holes provided in an attaching member and an attached member, comprising:
   a head portion locking one surface of one of either the attaching member or the attached member;
   a center support pillar extending downward from the head portion, to be inserted into the attachment holes;
   auxiliary support pillars extending downward from the head portion, and extending laterally outwardly from one part of each side portion of the center support pillar in a direction opposite to each other such that a longitudinal direction of a cross-sectional surface perpendicular to an extending direction thereof is perpendicular to a longitudinal direction of a cross-sectional surface perpendicular to an extending direction of the center support pillar, the auxiliary support pillars being arranged symmetrical with respect to a center line of the center support pillar;
   a pair of elastic legs interconnected with end portions of the center support pillar and the auxiliary support pillars, and expanding in a V-shape from the end portion of the center support pillar toward side portions of the auxiliary support pillars to be symmetrical with respect to the center axis of the center support pillar and angularly displaced with respect to a plane passing through the center of the center support pillar;
   locking portions provided in side, end portions of the pair of elastic legs, to lock with the other of either the attaching member or the attached member; and
   empty spaces provided in the auxiliary support pillars, for housing deformed portions of the elastic legs when the pair of elastic legs is inserted into the attachment hole while the pair of elastic legs is deforming.

2. A clip according to claim 1, wherein at least one of the center support pillar and the pair of elastic legs includes guide surfaces inclining toward the head portion from the end portion of the center support pillar.

3. A clip according to claim 2, wherein the guide surfaces of the elastic legs inclines circumferentially with respect to the center axis of the center support pillar.

4. A clip according to claim 3, wherein the auxiliary support pillars include arc-like portions, each extending circumferentially in one direction therefrom so that the auxiliary support pillars are not arranged symmetrical with respect to a plane including the center line.

5. A clip according to claim 3, wherein the empty space extends from a side portion of the arc-like portion of the auxiliary support pillar.

* * * * *